3,342,895
EPOXY RESINS PREPARED BY THE REACTION OF EPIHALOHYDRIN WITH A RESIN FORMED BY REACTING A PHENOL WITH A LONG CHAIN HALOGENATED HYDROCARBON CONTAINING AT LEAST 2 HALOGEN ATOMS
Robert Schmitz-Josten, Cologne-Stammheim, Günter Frank and Richard Wegler, Leverkusen, and Karl-Heinz Andres, Cologne-Flittard, Germany, assignors to Farbenfabriken Bayer Aktiengesellschaft, Leverkusen, Germany, a German corporation
No Drawing. Filed Oct. 16, 1964, Ser. No. 404,480
Claims priority, application Germany, Nov. 14, 1963, F 41,274
10 Claims. (Cl. 260—830)

It is known that epoxide resins can be produced by reacting epichlorhydrin with diphenols and polyphenols, for example, 4,4-dihydroxydiphenyl methane and novolaks, i.e., condensation products of phenols and aldehydes, produced in an acid medium. It is also known to harden such epoxide resins, especially using polycarboxylic acids, polycarboxylic anhydrides, polythiols or aliphatic or aromatic polyamides, as hardeners.

It is also known that hardened epoxide resins with improved elasticity can be obtained by employing either hardeners or epoxide resins with elasticising intermediate elements, particularly long-chain hydrocarbon radicals. Such elastified epoxide resins can, for example, be prepared by condensing aliphatic unsaturated compounds such as natural oils, long-chain polyalcohols or low molecular weight polyolefins, e.g., polybutadiene, with phenols and by reacting the polyphenols thus obtained with epihalohydrins to form the corresponding glycidyl ethers.

It has now been found that shaped elements with particularly advantageous properties, based on epoxide resins of glycidyl ethers of polyphenols, can be obtained if glycidyl ethers of nuclear condensation products of phenols and long-chain halogenated paraffins containing at least two halogen atoms, optionally in admixture with other epoxide resins, are cured or hardened with conventional epoxide resin hardeners.

Long-chained chlorinated paraffins of a straight-chain and optionally slightly branched character with a chlorine content between 10 and 50% by weight and containing at least two chlorine atoms are preferably used for the process according to the invention. Mono-nuclear or bi-nuclear phenols, more especially those which contain one to two phenolic hydroxyl groups, are preferably used as phenol components in the production of the nuclear-condensation products employed according to the invention.

Long-chain halogenated paraffins, more especially chlorinated paraffins, with at least two chlorine atoms, with a chlorine content between approximately 10 and 50% by weight, advantageously 15 to 40% by weight are employed for the production of the nuclear condensation products of halogenated paraffins and phenols. Particularly useful for this purpose are those chlorinated paraffins which are, for example, obtained by chlorination of saturated or subsequently hydrogenated slightly branched paraffin hydrocarbons with 10 to 40 carbon atoms; it is also possible to employ mixtures of such hydrocarbons, for example those obtained by the Fischer-Tropsch synthesis or in the extraction of paraffin from petroleum fractions by the urea process.

The production and chlorination of such paraffins is, for example, described by F. Asinger, "Chemie und Technologie der Paraffinkohlenwasserstoffe," Akademie-Verlag Berlin (1956).

It is obvious that the corresponding brominated paraffins can also be used. The term phenol is understood to comprise compounds which contain hydroxyl groups attached to an aromatic ring, so that e.g., naphthols and alkyls which are substituted by phenyl radicals are included in the meaning of phenols.

Any arbitrary monophenol or polyphenol can be used as phenol component in the production of the nuclear-condensation products: mono-nuclear or bi-nuclear phenols with 1 to 2 phenolic hydroxyl groups are, however, of particular interest. These phenolic hydroxyl groups of polyphenols can, if desired, be partially etherified. Phenol, cresols, xylenols, naphthols and other aromatic hydroxyl compounds, which have at least one hydrogen atom which can be replaced during alkylation, or mixtures thereof are examples of phenol components. Alkylated phenols, such as o-cresol and more especially 2,4-dialkylphenols, are particularly suitable, since they produce polyphenols of lower viscosity and lighter colour. Polyphenols, such as resorcinol, hydroquinone, dihydroxydiphenyl methane or dihydroxydiphenyl propane, can also be employed. The alkylation of phenols with chlorinated paraffins as known per se, is carried out with the aid of acid catalysts preferably of the Friedel-Crafts type; this process is preferably carried out by using an excess of the phenols if products of low molecular weight are desired. In general, the excess phenol serves as solvent; inert organic solvents such as halogenated or nitrated hydrocarbons, e.g., carbon tetrachloride, nitrobenzene or dichlorobenzene, can, however, additionally in this process be used. Aluminium chloride or stannic chloride can be used as acid catalysts but metallic zinc, zinc chloride and acid fullers earth, or mixtures of these catalysts are particularly suitable. Iron chloride is not particularly suitable. The condensation which proceeds with elimination of hydrogen chloride may be carried out at temperatures from about 120–200° C. in a stirrer-type vessel which is advantageously of ceramic material. If light-colored polyphenols are desired, the reaction should be carried out in the absence of iron compounds. Polyphenols with an advantageous content of 3 to 8% of phenolic OH groups and 0.1 to 15% of unreacted chlorine are the preferred reaction products.

In contrast to condensation products of phenols and polybutadiene of low molecular weight the reaction products of phenols and chlorinated paraffins described above show a statistical distribution of phenol units which are attached to carbon atoms lying between the chain ends of the paraffin component. The molecular weight and the viscosity of these alkylation products are in fact dependent upon the nature of the chlorinated paraffins and phenols which are used and on the reaction conditions, e.g., the proportions of reactants the catalyst employed, the reaction time and the temperature. Light-coloured phenol alkylation products of low viscosity are obtained if weakly acid catalysts, for example fullers earth are used and the reaction is stopped when the products contain 0.1 to 15% by weight of unreacted chlorine.

Before the phenol alkylation products thus obtained are transformed into the corresponding glycidyl ethers, they can also be modified by methods usual in the phenol resin chemistry, for example, by etherification with bis-halogen compounds or by after-condensation with formaldehyde or other carbonyl compounds in a quantity not sufficient for cross linking. Alkylation products which still contain halogen can, moreover, be reacted with monophenols or polyphenols.

The production of the glycidyl ethers of the phenol/chlorinated paraffin condensation products, that is to say, of the corresponding polyepoxides, is effected in a manner similar to known methods by reacting the condensation products with epihalohydrins or dihalohydrins in a quantity at least equivalent to the number of the phenolic hydroxyl groups. The reaction is advantageously carried out at elevated temperatures with from 2 to 6 stoichiometric equivalents of epichlorohydrin. The reaction expediently takes place at a temperature from 80 to 120° C. in the presence of bases, advantageously solid or aqueous alkali metal hydroxides. On the other hand, it is also readily possible for these phenol alkylation products to be transformed into the corresponding chlorohydrin ethers by reaction with excess epichlorohydrin in the presence of quaternary ammonium salts, thioethers or sulphonium compounds (as described in Belgian patent specification 645,482) and then to convert the chlorohydrin ethers into the corresponding polyepoxides by means of bases, such as sodium hydroxide solution.

Condensation products which contain 1.5 to 3 mols of phenol incorporated by condensation per mol of chlorinated paraffin are preferably used for the production of the glycidyl ethers or polyepoxides of the phenol/chlorinated paraffin condensation products.

One way to modify the products obtainable by the process of the present invention is to react epihalohydrin with mixtures of 10 to 90% of the previously described condensation products of chlorinated paraffin and phenols and 90 to 10% of other conventional polyphenols to form the corresponding glycidyl ethers, as described above. It is preferred to use for this purpose diphenols and polyphenols of the dihydroxydiphenyl methane type, for example 4,4'-dihydroxydiphenyl methane or propane, as well as novolaks of low molecular weight, such as those obtained by acid condensation of phenol, cresols or resorcinol with less than an equivalent quantity of formaldehyde. Before curing the epoxide resins as described, whilst shaping, these resins can also be mixed with substances which lower their viscosity, such as monoepoxides, or with other epoxide resins, in order to adapt the properties of the hardened products to their intended use.

The previously described glycidyl ethers or polyepoxide compounds can be hardened in a manner known per se, optionally in stages, using the conventional hardeners for epoxide resins. The quantities of hardener are advantageously equivalent quantities as regards the functional groups, but it is also possible to use a deficiency down to 25% or an excess up to 50% of hardener, based on the equivalent quantities.

Amongst the hardening agents that can be used for the hardening at high temperature, which can also be carried out in stages, are the following: polyphenols, such as 4,4'-dihydroxydiphenyl propane or methane, hydroquinone, novolaks and resorcinol-formaldehyde resins, polycarboxylic acids or polycarboxylic anhydrides, such as oxalic acid or adipic acid, dimerised and trimerised linseed oil fatty acids, polyesters with terminal carboxyl groups, polymers and copolymers of such unsaturated carboxylic acids as acrylic acid, methacrylic acid and fumaric acid, phthalic anhydride, terephthalic anhydride and hexahydrophthalic anhydride, as well as their alkyl and alkenyl derivatives, succinic anhydride, maleic anhydride, citraconic anhydride, glutaric anhydride, adducts and copolymers of maleic anhydride with such unsaturated compounds as styrene, vinyl toluene, propylene, isobutylene or tetrapropylene, terpene hydrocarbons, such esters of unsaturated natural fatty acids as linseed oil, wood oil, soya bean oil, and also (methyl)-endomethylene-tetrahydrophthalic anhydride, hexachloro-endomethylene tetrahydrophthalic anhydride, trimellitic and pyromellitic anhydrides. In addition, aromatic polyamines such as metaphenylene diamine, bis(4-amino-phenyl)-methane, -sulphone and -ether, as well as compounds of aluminium, titanium, silicon, and boron, such as aluminium phenoxide, titanium tetrabutyl ester or tris-ethanolamine borate, adducts of boron fluoride and tertiary amines, ureas or hexamethylene tetramine and dicyandiamide.

Suitable for the hardening at room temperature are aliphatic polyamines with two or more reactive hydrogen atoms, such as ethylene diamine, triethylene tetramine, pentaethylene hexamine, N-aminoethyl piperazine, tripropylene tetramine, hexamethylene diamine, xylylene diamine or bis-(p-aminocyclohexyl)-methane; aminopolyamides, such as are prepared by condensation of polycarboxylic acids with polyamines, for example of dilinolenic acid and diethylene triamine.

It is, moreover, possible for the polyoxides to be used according to the invention to be blended with conventional known epoxide resins. Compounds which have more than one epoxide group in the molecule can be used in this way, for example, polyglycidyl ethers of such polyhydric phenols as 4,4'-dihydroxydiphenyl propane or 4,4'-dihydroxydiphenyl methane, polyglycidyl ethers of hydroxyarylcarboxylic acids, as described in French patent specification No. 1,346,222, polyglycidyl thioethers of polyhydric thiols, such as bis-mercaptomethylbenzene and epichlorohydrin, basic polyepoxides which are for example prepared from bis-(4-monomethylaminophenyl)-methane, aniline or 4,4'-diamino-diphenyl-methane and epichlorohydrin, polyepoxides based on 1,3,5-triazine, polyglycidyl ethers of polyhydric alcohols, such as 1,4-butanediol, glycidyl esters of dicarboxylic and polycarboxylic acids, such as diglycidyl phthalate, N,N'-diepoxypropyl oxamide or triglycidyl cyanurate, epoxidation products of severally unsaturated compounds, such as vegetable oils and their conversion products, epoxidation products of diolefines and polyolefines, such as butadiene, vinyl cyclohexene or polybutadiene, and epoxidation products of bicycloheptene derivatives or condensed ring systems containing a cyclohexene or cyclopentene ring. In addition, glycidyl polyethers of polyhydric phenols, for example of 1,1-bis-(4-hydroxyphenyl)-methane, hydroquinone, resorcinol or of 1,3-bis- (4 - hydroxyphenyl) - 2 - hydroxy-propane. It is obviously possible for mixtures of the polyepoxides to be used.

The epoxide resins and the products of hardening which are prepared by the process according to the invention show the quite important advantage that, according to the choice of the starting components, proportions, hardening components and conditions, they can very readily be adapted to their intended use. It is easy to adjust mechanical properties, solubilities or degrees of crosslinking in the required manner from the outset. Higher molecular weights can, for example, be obtained by introducing particularly long-chain paraffins or by using smaller quantities of phenol. The use of polyphenols permits the production of resins which are particularly resistant to temperature. By comparison with polyepoxides of similar structure, the low viscosity which the resin mixtures can be made to have a particular advantage. The process is also capable of being carried out with the use of starting materials which are particularly easily obtainable industrially and can also be a single-pot process.

The epoxide resins obtainable according to the process are generally soluble in kerosene and are suitable for the manufacture of moulds and tools, for example dropping hammer dies: they can be used in pattern and template construction, it is possible for the resin-hardener mixtures to be processed together with organic or inorganic fillers, fibres or dyestuffs. They can also be used as cementing, coating and sealing materials in the building industry and as elasticising lining materials for tubes and vessels, particularly for increasing the acid resistivity. They may also be used in combination with bitumen and other tar products, reactive phenol resins, melamine resins and urea resins. Combinations with tar products are especially suitable for use in road construction, e.g., as bonding adhesives or as covering material for concrete and asphalt roads; inert particles, such as sand or gravel, can also be incorporated. They are in addition suitable, in combination with glass and asbestos fibres or mats, for the production of laminates, and in admixture with cut fibres or inorganic fillers, for the production of moulding compositions.

Another possible application of the indicated epoxide resins is as softeners, plasticisers, adhesion promoters and stabilisers for plastics which contain halogen, such as polyvinyl chloride and copolymers of vinyl and vinylidene chlorides.

The parts and percentages mentioned in the following examples are parts and percentages by weight, unless otherwise indicated.

Example 1

Hydrogenated slack paraffin wax from the Fischer-Tropsch synthesis, which contains paraffins with 18 to 22 carbon atoms, is chlorinated to a chlorine content of 26.3%. 2,000 parts of this chlorinated paraffin are added dropwise at 135° C. to a mixture of 2,000 parts of phenol and 40 parts of powdered zinc within three hours, hydrogen chloride being split off. The mixture is stirred for another four hours at 170° C. and 1,100 parts of phenol are distilled off at 115° C./20 mm. Hg. The residue is diluted with 1,000 parts by volume of benzene and 200 parts by volume of isopropanol, concentrated hydrochloric acid is added until there is an acidic Congo reaction and the mixture is stirred for one hour. The zinc salts are thereafter washed out with saturated aqeuous sodium chloride solution and the organic layer is distilled off up to a sump temperature of 170° C./15 mm. Hg and filtered while hot. 2250 parts of paraffin-phenol resin are obtained; OH content: 6.0%; chlorine content 0.11%.

664 parts of a 50% sodium hydroxide solution are added to 2140 parts of the above described paraffin-phenol resin, 3490 parts of epichlorohydrin and 1500 parts by volume of isopropanol at reflux temperature within 1 hour. Heating is continued for 4 hours under reflux, the aqueous phase is separated and the isopropanol and epichlorohydrin are distilled off at 60° C./12 mm. Hg. The residue is dissolved in 3,000 parts by volume of benzene and stirred with an aqueous solution of primary sodium phosphate until the pH value is 5 to 6. The organic layer is then concentrated by evaporation in vacuo, finally at 120° C./0.1 mm. Hg. The filtered residue amounts to 2456 parts, corresponding to 96% of the theoretical. Epoxy equivalent: 507 (calculated 340); viscosity $\eta_{20}$=16,300 cp.; chlorine content=1.14%.

Example 2

Mepasin (a $C_{14}$–$C_{18}$ saturated hydrocarbon mixture) from the Fischer-Tropsch synthesis is chlorinated up to a chlorine content of 26.5% while being irradiated with ultra-violet light. 2,500 parts of the chlorinated product are added dropwise within 3 hours to a stirred mixture of 2,500 parts of phenol and 50 parts of powdered zinc and the mixture is thereafter further condensed for 9 hours at 140° C. The reaction product is then stirred for another two hours with 480 parts of sodium phenoxide at 140° C. and the excess of phenol is subsequently distilled off at 115° C. in vacuo. After working up, as in Example 1, 2640 parts of mepasin phenol are obtained; OH content=6.25%; chlorine content=0.15%; $\eta_{20}$=14,700 cp. 2,420 parts of this mepasin/phenol reacting product, 4,120 parts of epichlorohydrin and 1,800 parts by volume of isopropanol are transformed in analogous manner to Example 1 with 784 parts of 50% sodium hydroxide solution into the glycidyl ether. Yield: 2900 parts=99.3% of the theoretical; epoxide equivalent 481 (theoretical 328); chlorine content=1.7%; $\eta_{20}$=1,570 cp.

Example 3

A mepasin phenol is prepared from chlorinated mepasin with 27% of chlorine, as in Example 2, but at 145° C. The resulting phenol has an OH content of 6.4%; chlorine content=0.2%; $\eta$=38,000 cp.

310 parts of granulated sodium hydroxide are introduced within 1 hour into 2,060 parts of this mepasin phenol, 3,585 parts of epichlorohydrin and 20 parts of water, while stirring vigorously at 90 to 95° C. The mixture is subsequently condensed for another 4 hours under reflux. The water and some of the epichlorohydrin are removed by vacuum distillation, the residue is filtered to remove sodium chloride and the filtrate is freed from the residual epichlorohydrin by vacuum distillation up to 130° C. sump temperature and 0.1 mm. Hg. The filtered residue (2,445 parts—90% of the theoretical) has the following properties: epoxide equivalent 463 (theoretical 322); chlorine content=1.5%; $\eta_{20}$=3,960 cp.

Example 4

A normal commercial slack paraffin wax obtained from petroleum and having a boiling range of 343 to 384° C. and an iodine number of 0.5 is chlorinated up to a chlorine content of 25%. 1,000 parts of the product are added dropwise at 140° C. to a stirred mixture consisting of 1,000 parts of phenol and 150 parts of an acid-activated montmorillonite catalyst, e.g., Tonsil ® K10, within one hour, and heated for a further 8 hours with exclusion of air at 160° C. The catalyst is filtered off with suction while hot and washed with toluene. The filtrate is decolourised with fullers earth and concentrated by evaporation in vacuo, finally at 150° C.

Yield: 1,058 parts of a paraffin phenol with an iodine colour number of 80; OH content: 5.15%; chlorine content 4.9%; $\eta_{20}$=7,200 cp.

1,265 parts of this product, 1,772 parts of epichlorohydrin and 10 parts of water are transformed with 153 parts of solid caustic soda, as in Example 3, into the glycidyl ether. A very light-coloured polyepoxide is obtained which has the following characteristic values: epoxide equivalent 514 (theoretical 386); chlorine content 5.2; $\eta_{20}$=1,850 cp.

Example 5

750 parts of phenol, 30 parts of zinc chloride and 750 parts of a chlorinated slack paraffin wax (39.5% of chlorine) are reacted at 140° C. for a reaction time of 8 hours. After working up the reaction product, 828 parts of a phenol resin with 5.85% of hydroxyl groups and 5.5% of chlorine are obtained. 582 parts of the phenol resin are dissolved in 925 parts of epichlorohydrin and 80 parts of solid sodium hydroxide are added at boiling temperature within 1 hour. Condensation takes a further three hours, the water formed during reaction being removed by azeotropic distillation. After separating sodium chloride, the reaction product is isolated by vacuum distillation up to a sump temperature of 130° C. at 0.02 mm. Hg. It is a viscous liquid resin at room temperature and has an epoxide equivalent of 522 and a chlorine content of 4.7%.

Example 6

1,000 parts of phenol, 20 parts of zinc chloride and 1,000 parts of chlorinated mepasin (24.7% of chlorine) are reacted for 8 hours at 145° C. and thereafter distilled in vacuo up to a sump temperature of 110° C., until the residue amounts to 1,254 parts. This is reacted at 100° C. with an aqueous solution of 50 parts of formaldehyde in 100 parts of water until the formaldehyde is consumed and thereafter distilled up to 120° C. in vacuo. The residue has an OH content of 7.1%. 480 parts of this residue are reacted with 925 parts of epichlorohydrin and 85 parts of solid sodium hydroxide, as described in Example 5. 498 parts of an epoxide resin, which is compatible with bitumen are obtained in the working up. Epoxy equivalent 408; viscosity $\eta_{20}$=5,500 cp.; chlorine content 2.1%.

Example 7

750 parts of o-cresol, 30 parts of zinc chloride and 750 parts of chlorinated mepasin (24.7% of chlorine) are reacted for 8 hours at 140° C., giving 810 parts of a cresol resin with the following characteristics: OH=5.65%; chlorine=0.97%; $\eta_{20}$=2,450 cp.

600 parts of this resin are dissolved as described in Example 5 in 920 parts of epichlorohydrin and reacted with 88 parts of sodium hydroxide. The working up yields 673 parts of a benzine-soluble epoxy resin; epoxide equivalent 493; chlorine content 1.57%; $\eta_{20}$=920 cp.

Example 8

In a manner similar to Example 7, a cresol resin which has 5.35% OH; 2.95% chlorine and a viscosity of $\eta_{20}$=5130 cp. is obtained from an industrial mixture of 72% of metacresol and 28% of p-cresol. A benzine-soluble epoxide resin is obtained from this by reaction with 1½ times its weight of epichlorohydrin and 13% by weight of sodium hydroxide. Epoxide equivalent 563; chlorine content 2.3%; viscosity $\eta_{20}$=905 cp.

Example 9

520 parts of phenol, 230 parts of resorcinol and 30 parts of zinc chloride are reacted for 9 hours at 140° C. with 750 parts of chlorinated mepasin (24.7% of chlorine). After the working up, 870 parts of a condensation product with 7.6% of hydroxyl groups and a chlorine content of 3.1% are obtained. 300 parts of epoxide resin are obtained by reacting 242 parts of the condensation product in 498 parts of epichlorohydrin with 43 parts of sodium hydroxide in accordance with the method indicated in Example 5. The epoxide equivalent is 407; chlorine content 2.5%; $\eta_{20}$=15,200 cp.

The following table shows the setting behaviour and the properties of resin/hardener mixtures, which contain the components according to the invention.

What we claim is:

1. A process which comprises reacting a phenol and a long chain halogenated paraffin containing at least two halogen atoms and having a halogen content between 10 and 50% by weight and having 10 to 40 carbon atoms, at temperatures of about 120° to 200° C. in the presence of an acid fullers earth or Friedel-Crafts catalyst to form a liquid resin alkylation product containing 3 to 8% by weight of phenolic OH groups and 0.1 to 15% by weight of halogen, reacting said alkylation product with either an epihalohydrin or a dihalohydrin at a temperature of from 80° to 120° C. in the presence of an alkali metal hydroxide to form a glycidyl ether, and then hardening the latter by reaction with a hardening agent selected from the group consisting of polyamines and amino polyamides.

2. Process of claim 1 wherein the hardening agent is a polyamine having aliphatic amino groups.

3. The process of claim 1 wherein said Friedel-Crafts catalyst is selected from the group consisting of aluminum chloride, stannic chloride, zinc, and zinc chloride.

4. The process of claim 1 wherein said halogenated paraffin is a $C_{10}$–$C_{40}$ chlorinated paraffin containing at least two chlorine atoms and having a chlorine content of 15 to 40% by weight.

5. A process which comprises reacting a phenol selected from the group consisting of mononuclear and bi-nuclear phenols with a long chain halogenated paraffin containing at least two halogen atoms and having a halogen content of 10 to 50% by weight, and having 10 to 40 carbon atoms, at temperatures between about 120° and 200° C. in the presence of an acid fullers earth or Friedel-Crafts catalyst to form a liquid resin alkylation product containing 3 to 8% by weight of phenolic OH groups and 0.1 to 15% by weight of halogen, and reacting said alkylation product with an epihalohydrin or dihalohydrin at a temperature of 80° to 120° C. in the presence of an alkali metal hydroxide and a hardening agent selected from the group consisting of polyamines and amino polyamides.

6. A process for the production of a hardened epoxy resin which comprises first mixing

| Composition | Setting time [1] at room temp. (min.) | Max. reaction temp. (° C.) | Notch impact toughness | Bending strength | Ball-pressure hardness | | Increase in wt. (per cent) on storage in water (90° C.) | Boiling HCl |
|---|---|---|---|---|---|---|---|---|
| | | | | | 10″ | 60″ | | |
| 70 g. resin acc. to Ex. 1<br>30 g. resin A[2]<br>8.5 g. Pentaethylenehexamine | 164 | 38 | 32.4 | 733 | 895 | 800 | 1.90 | 4.01 |
| 70 g. resin acc. to Ex. 2<br>30 g. resin A[2]<br>9 g. Pentaethylenehexamine | 76 | 93 | 45.2 | 771 | 955 | 828 | 2.17 | 5.07 |
| 50 g. resin acc. Ex. 2<br>50 g. resin A[2]<br>10.5 g. Pentaethylenehexamine | 39 | 140 | 26.3 | 845 | 1,085 | 1,005 | 2.07 | 5.44 |
| 30 g. resin acc. Ex. 2<br>70 g. resin A[2]<br>12.5 g. Pentaethylenehexamine | 35 | 190 | 18.9 | 1,092 | 1,410 | 1,330 | 2.19 | 5.77 |
| 50 g. resin acc. Ex. 2<br>50 g. resin A[2]<br>16 g. n-bis(β aminoethyl) diaminodibutylether | 35 | 165 | 43.1 | 706 | 945 | 805 | 2.17 | 4.90 |
| 50 g. resin acc. Ex. 2<br>50 g. resin A[2]<br>8.5 g. Triethylenetetramine | 38 | 160 | 38.0 | 602 | 1,055 | 935 | 2.46 | 4.79 |
| 50 g. resin acc. Example 2<br>50 g. resin B[3]<br>10.5 g. Diethylenetriamine | 53 | 250 | 12.9 | 676 | 1,275 | 1,200 | | |
| 60 g. resin acc. Ex. 3<br>40 g. resin A[2]<br>11 g. Pentaethylenehexamine | 35 | 126 | 26.7 | 910 | 1,265 | 1,170 | 2.44 | 5.37 |
| 60 g. resin acc. Ex. 4<br>40 g. resin A[2]<br>9.5 g. Pentaethylenehexamine | 182 | 32 | 55.7 | 564 | 595 | 490 | 2.25 | 5.52 |
| 50 g. resin acc. Ex. 5<br>50 g. resin A[2]<br>10.5 g. Pentaethylenehexamine | 42 | 142 | 16.2 | 1,209 | 1,645 | 1,545 | 1.45 | 4.61 |
| 60 g. resin acc. Ex. 7<br>40 g. resin A[2]<br>10 g. Pentaethylenehexamine | 89 | 56 | 38.7 | 823 | 940 | 850 | 1.88 | 4.96 |
| 60 g. resin acc. Ex. 8<br>40 g. resin A[2]<br>9.5 g. Pentaethylenehexamine | 183 | 36 | 30.9 | 567 | 670 | 565 | 2.53 | 5.86 |
| 60 g. resin acc. Ex. 9<br>40 g. resin A[2]<br>9.5 g. Pentaethylenehexamine | 289 | 32 | 27.6 | 708 | 950 | 825 | 2.19 | 5.51 |

[1] Measured with a 100 g. pot. mixture.
[2] Resin A=diglycidyl ether of 4,4′ dioxydiphenyl dimethyl methane.
[3] Resin B=diglycidyl ether of aniline.

(A) 30 to 70% by weight of a liquid epoxy resin obtained by reaction of a long chain polyphenol having a phenolic hydroxyl content from 3 to 8% by weight and a halogen content from 0.1 to 15% by weight, with epichlorohydrin in the presence of an alkali metal hydroxide, said reaction being performed at temperatures between about 120° and 200° C. in the presence of a Friedel-Crafts or fullers earth catalyst, said long chain polyphenol being formed by reaction of a phenol with a $C_{10}$–$C_{40}$ halogenated paraffin containing at least two halogen atoms and having a halogen content between 15 and 40% by weight.

(B) 70 to 30% by weight of a conventional polyepoxide selected from the group consisting of N-diepoxypropyl aniline, a polyglycidyl ether of 4,4'-dihydroxy-diphenyl-propane, a polyglycidyl ether of 1,4 butane-diol, and mixtures thereof; and subsequently hardening the resultant resin mixture by reaction thereof with 80 to 120%, per epoxy groups, of the theoretical amount of a polyamine having aliphatic amino end-groups and at least three hydrogen atoms bonded to the nitrogen atoms, the theoretical amount of polyamine being the quotient of the molecular weight of the polyamine and the number of the hydrogen atoms bonded to the nitrogen atoms of the polyamine.

7. Process of claim 6 wherein the mixture of resins A and B is a liquid mixture containing an average of 1.5 to 3 phenolic hydroxyl groups per molecule.

8. A hardened epoxy resin prepared by the process of claim 1.

9. A hardened epoxy resin mixture prepared by the process of claim 6.

10. A liquid epoxy resin which can be readily mixed with a polyamine hardening agent and with filler material at room temperature which comprises the reaction product of (1) the alkylation product formed by reacting a mononuclear or bi-nuclear phenol with a $C_{10}$–$C_{40}$ halogenated paraffin containing at least two halogen atoms and having a halogen content of 10 to 50% by weight, at temperatures of 120° to 200° C., in the presence of an acid fullers earth or Friedel-Crafts catalyst with (2) an apihalohydrin or a dihalohydrin, said reaction product of (1) and (2) being produced at a temperature of from 80 to 120° C. in the presence of an alkali metal hydroxide.

References Cited

UNITED STATES PATENTS 2,340,838   2/1944   Otto et al. _____ 260—61

OTHER REFERENCES

Paquin: "Epoxydverbindungen und Epoxydharze," pp. 256 and 278, Springer-Verlag, Berlin, 1958.

MURRAY TILLMAN, *Primary Examiner.*

WILLIAM H. SHORT, *Examiner.*

T. D. KERWIN, P. LIEBERMAN, *Assistant Examiners.*